United States Patent
Kurahashi

(10) Patent No.: US 9,453,716 B2
(45) Date of Patent: Sep. 27, 2016

(54) METHOD OF MEASUREMENT AND APPARATUS FOR MEASUREMENT OF TOOL DIMENSIONS

(75) Inventor: Yasuhiro Kurahashi, Aiko-Gun (JP)

(73) Assignee: MAKINO MILLING MACHINE CO., LTD., Tokyo (JP)

( * ) Notice: Subject to any disclaimer, the term of this patent is extended or adjusted under 35 U.S.C. 154(b) by 238 days.

(21) Appl. No.: 13/824,278

(22) PCT Filed: Oct. 21, 2011

(86) PCT No.: PCT/JP2011/074347
§ 371 (c)(1),
(2), (4) Date: Mar. 15, 2013

(87) PCT Pub. No.: WO2012/053645
PCT Pub. Date: Apr. 26, 2012

(65) Prior Publication Data
US 2013/0176429 A1 Jul. 11, 2013

(30) Foreign Application Priority Data

Oct. 22, 2010 (JP) ................. 2010-237762
Oct. 26, 2010 (JP) ................. 2010-239868
Oct. 27, 2010 (JP) ................. 2010-241331

(51) Int. Cl.
*G01B 11/00* (2006.01)
*B23Q 17/24* (2006.01)

(52) U.S. Cl.
CPC ......... *G01B 11/002* (2013.01); *B23Q 17/2457* (2013.01)

(58) Field of Classification Search
CPC ............................. H04N 7/18; G01B 11/002
See application file for complete search history.

(56) References Cited

U.S. PATENT DOCUMENTS 4,004,083 A * 1/1977 Norem ................. G01B 11/002
250/203.5
4,845,763 A * 7/1989 Bandyopadhyay .... G01B 11/24
348/135

(Continued)

FOREIGN PATENT DOCUMENTS

CN 101517612 8/2009
CN 101693347 4/2010

(Continued)

OTHER PUBLICATIONS

International Search Report mailed Jan. 24, 2012, directed to International Application No. PCT/JP2011/074347; 6 pages.

Primary Examiner — Jay Patel
Assistant Examiner — Irfan Habib
(74) Attorney, Agent, or Firm — Morrison & Foerster LLP

(57) ABSTRACT

Provided are a method for measuring tool dimensions and a measurement device, whereby if a machine tool (10) cannot fit the overall outline of a tool (20) inside the field of vision (V) for an image from an imaging device (33), the field of vision (V) of the imaging device (33) is moved by relatively moving the imaging device (33) and the tool (20). In addition, the imaging device (33) can follow the outline (54) of the tool (20) by moving the field of vision (V), because the movement direction (53) for the field of vision (V) is determined on the basis of the partial outline (51) specified based on image data. In this way, even when measuring dimensions for a tool (20) with a larger diameter than the field of vision (V) of the imaging device (33), a partial outline (51) of a desired range, for example, is specified. An outline of a desired range for the tool (20) is extracted if a plurality of specified partial outlines (51) are combined. Measurement of the dimensions of the tool (20) is possible by using such outlines.

3 Claims, 13 Drawing Sheets

(56) References Cited

U.S. PATENT DOCUMENTS

| | | | | |
|---|---|---|---|---|
| 5,267,014 A * | 11/1993 | Prenninger | ............ | G05B 19/18 348/135 |
| 5,973,788 A * | 10/1999 | Pettersen | ................ | G01S 5/163 356/614 |
| 6,147,748 A * | 11/2000 | Hughes | ................ | G01S 7/4812 356/4.09 |
| 6,301,007 B1 * | 10/2001 | Hanlon | ................. | B23Q 17/22 356/400 |
| 7,576,847 B2 * | 8/2009 | Bridges | ................... | G01S 5/163 356/138 |
| 8,358,870 B2 | 1/2013 | Abiko | | |
| 2002/0003415 A1 * | 1/2002 | Nakai | ............... | G05B 19/4065 318/569 |
| 2003/0106228 A1 * | 6/2003 | Fujishima | .......... | B23Q 17/2233 33/502 |
| 2006/0007449 A1 * | 1/2006 | Christoph | ............ | G01B 11/005 356/601 |
| 2007/0250204 A1 * | 10/2007 | Ould | .................... | G05B 19/401 700/181 |
| 2008/0051927 A1 * | 2/2008 | Prestidge | ............ | G05B 19/401 700/195 |
| 2008/0184570 A1 * | 8/2008 | Buttau | ................. | B23B 31/028 33/201 |
| 2009/0088048 A1 * | 4/2009 | Basler | ................... | B23Q 17/09 451/9 |
| 2010/0063612 A1 * | 3/2010 | Wang | .................... | B23Q 17/20 700/110 |
| 2010/0241267 A1 * | 9/2010 | Nishikawa | ............ | B23Q 17/20 700/195 |
| 2011/0170113 A1 * | 7/2011 | Bridges | ................ | G01B 11/002 356/482 |
| 2011/0265835 A1 * | 11/2011 | Sato | ................... | B23Q 17/0914 134/56 R |
| 2012/0188380 A1 * | 7/2012 | Drescher | ............ | G01N 21/8806 348/180 |
| 2013/0030758 A1 * | 1/2013 | Suzuki | .................. | B23Q 17/24 702/167 |

FOREIGN PATENT DOCUMENTS

| | | |
|---|---|---|
| JP | 2-41856 | 2/1990 |
| JP | 6-170699 | 6/1994 |
| JP | 6-294619 | 10/1994 |
| JP | 7-129755 | 5/1995 |
| JP | 9-83843 | 3/1997 |
| JP | 10-178584 | 6/1998 |
| JP | 11-118444 | 4/1999 |
| JP | 2002-219633 | 8/2002 |
| JP | 2004-37386 | 2/2004 |
| JP | 2005-311924 | 11/2005 |
| JP | 2006-186796 | 7/2006 |
| JP | 2007-49489 | 2/2007 |
| JP | 3880110 | 2/2007 |
| JP | 2007-235696 | 9/2007 |
| JP | 2007-326196 | 12/2007 |
| JP | 2008-4123 | 1/2008 |
| JP | 2010-19559 | 1/2010 |
| JP | 2010-136748 | 6/2010 |
| WO | WO-00/75869 | 12/2000 |
| WO | WO-2008/090608 | 7/2008 |
| WO | WO-2008/105530 | 9/2008 |

* cited by examiner

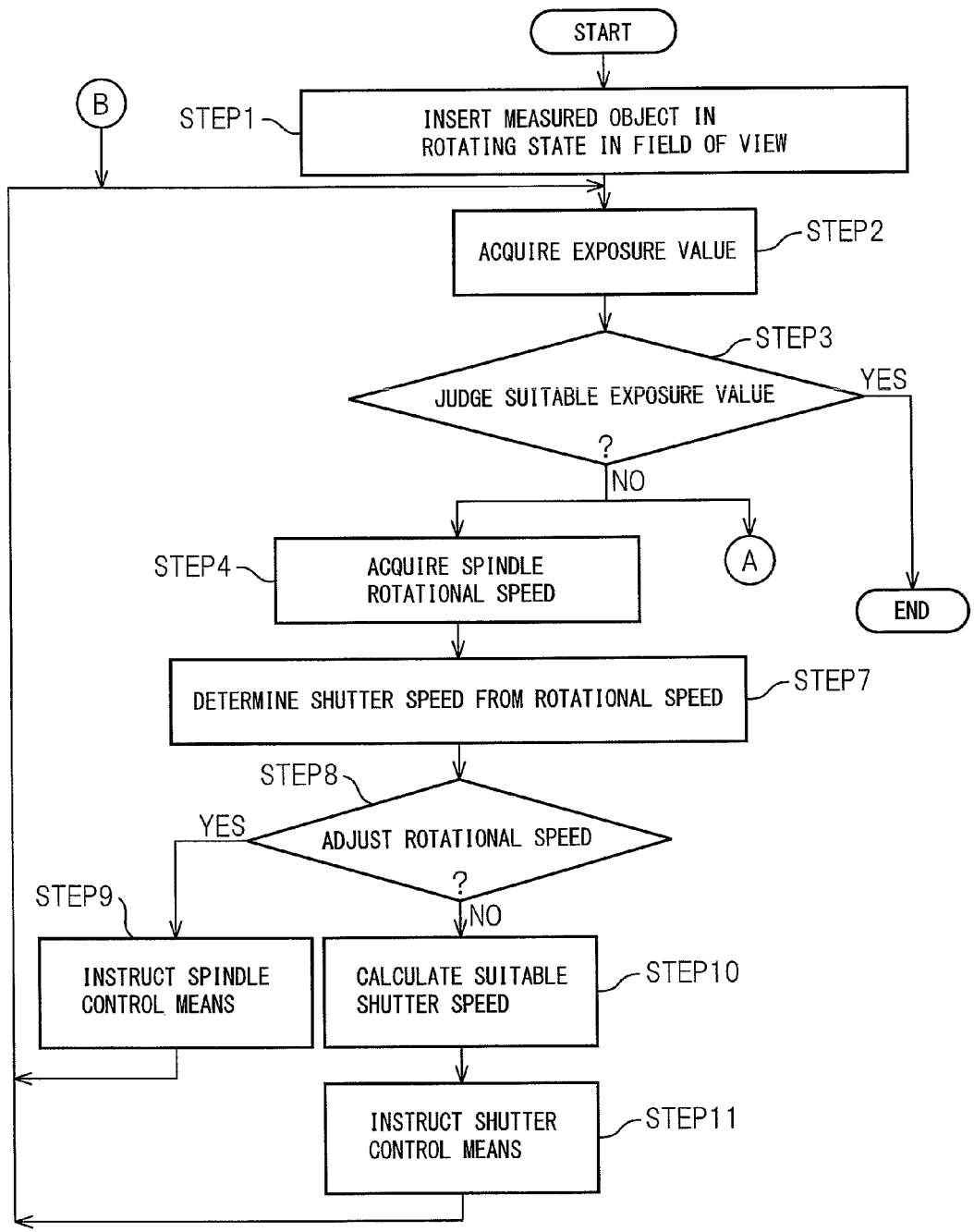

METHOD OF MEASUREMENT AND APPARATUS FOR MEASUREMENT OF TOOL DIMENSIONS

REFERENCE TO RELATED APPLICATIONS

This application is the national stage application under 35 USC 371 of International Application No. PCT/JP2011/074347, filed Oct. 21, 2011, which claims the priority of Japanese Patent Application No's. 2010-237762, filed Oct. 22, 2010, Japanese Patent Application No. 2010-239868, filed Oct. 26, 2010, and Japanese Patent Application No. 2010-241331, filed Oct. 27, 2010, the entire contents of which are incorporated herein by reference.

FIELD OF THE INVENTION

The present invention relates to a method and apparatus for measuring tool dimensions such as a position and shape of a cutting edge of a tool, length and diameter of a tool, and slant of a tool with respect to a spindle for a tool which is used in a for example CNC (computer numerical control) machine tool.

BACKGROUND OF THE INVENTION

In, for example, a machining center or other NC machine tool, when working a workpiece, a tool such as a drill bit or end mill which is attached to the spindle is made to rotate while contacting the workpiece. In raising the precision of positional control of the tool, the position of the tool with respect to the spindle, heat deformation of the rotating spindle, etc. must be considered. Therefore, it is important to actually measure in advance the dimensions of the tool which is attached to the spindle.

PLT 1: Japanese Patent No. 3880110
PLT 2: Japanese Patent Publication No. 9-83843A
PLT 3: Japanese Patent Publication No. 2007-326196A
PLT 4: Japanese Patent Publication No. 2007-49489A

SUMMARY OF THE INVENTION

Technical Problem

In the past, a method of capturing an image of a tool which is attached to the spindle to measure the dimensions of the tool has been proposed. In this measurement method, light which is emitted from a light source is used form a shadow of the tool on an image. The contour of this shadow is specified to measure the dimensions of the tool. However, for example, when a tool of a larger size than the field of view of the image capture is used in the NC machine tool, only part of the contour of the tool cutting edge is specified on the captured image. In this case, it is impossible to measure the dimensions of the tool.

The present invention was made in consideration of this situation and has as its object the provision of a method of measurement and apparatus for measurement of tool dimensions which can measure the dimensions of a tool even for a tool of a size larger than the field of view of the image capture device.

Solution to Problem

To achieve the above object, according to the present invention, there is provided a method of measurement of tool dimensions which uses an image capture device which moves relative to a tool to capture an image of the tool and which uses the obtained image data to measure dimensions of the tool, the method of measurement of tool dimensions comprising the steps of using image data of part of the contour of the tool captured by the image capture device as the basis to specify a partial contour of the tool, using the specified partial contour as the basis to make the field of view of the image capture device move in a direction of the contour of the tool outside of the field of view of the image data, and outputting movement commands for making the image capture device and the tool move relative to each other so that the field of view of the image capture device moves in the determined direction of movement of the field of view.

In this method of measurement of tool dimensions, the specification of the partial contour, the determination of the direction of movement of the field of view, and the output of movement commands for relative movement of the image capture device and the tool are repeated. Further, in determination of the direction of movement of the field of view, it is also possible to enlarge the field of view of the image capture device to specify the schematic contour which is outside the field of view in the image data for which the partial contour is specified. In addition, in this method of measurement of tool dimensions, the method may be further provided with a step of using a plurality of the image data as the basis to connect specified partial contours together and extract a connected contour of the tool.

Further, according to the present invention, there is provided an apparatus for measurement of tool dimensions which captures an image of a tool and uses the obtained image data to measure dimensions of the tool, the apparatus for measurement of tool dimensions comprising an image capture device which captures an image of the tool to generate image data and a processing device which uses the generated image data as the basis to specify a partial contour which forms a part of the contour of the tool, uses the specified partial contour as the basis to determine a movement direction for making a field of view of the image capture device move in the direction of the contour of the tool outside of the field of view of the image data, and outputs movement commands for making the image capture device and the tool move relatively so that the field of view of the image capture device moves in the movement direction of the field of view determined.

In this apparatus for measurement of tool dimensions, the processing device repeats the specification of the partial contour, the determination of the direction of movement of the field of view, and the output of movement commands for relative movement of the image capture device and the tool. Further, the processing device enlarges the field of view of the image capture device and specifies the schematic contour which is outside the field of view in the image data for which the partial contour is specified. In addition, the processing device uses a plurality of the image data as the basis to connect specified partial contours together to extract a connected contour of the tool.

The apparatus for measurement of tool dimensions is further provided with a display device which displays a shape of the tool which is specified based on the image data and an input device which inputs a predetermined command regarding the shape of the tool on the display device.

According to the present invention, it is possible to provide a method of measurement and apparatus for measurement of tool dimensions which measure the dimensions of a tool even for a tool of a size larger than the field of view of the image capture device. Further, it is possible to perform measurement with a high precision with the large image data as it is without reduction of the measurement precision due to reduction of the size of the image data so that the entire contour of a tool falls in a single field of view. Furthermore, if determining the movement direction of the field of view by a predetermined algorithm in a software manner, zoom-in and zoom-out devices which enlarge the field of view of the image capture device become unnecessary.

BRIEF DESCRIPTION OF THE DRAWINGS

FIG. 12A is a flow chart for explaining one example of a routine in an image capture type tool measurement apparatus according to the present invention for obtaining a grasp of the image capture environment/conditions, judging the image capture conditions, and deriving adjustment commands to adjust the image capture conditions of the image capture element of the image capture unit.

DETAILED DESCRIPTION OF THE INVENTION

Below, embodiments of the present invention will be explained with reference to the drawings.

Figure 1:
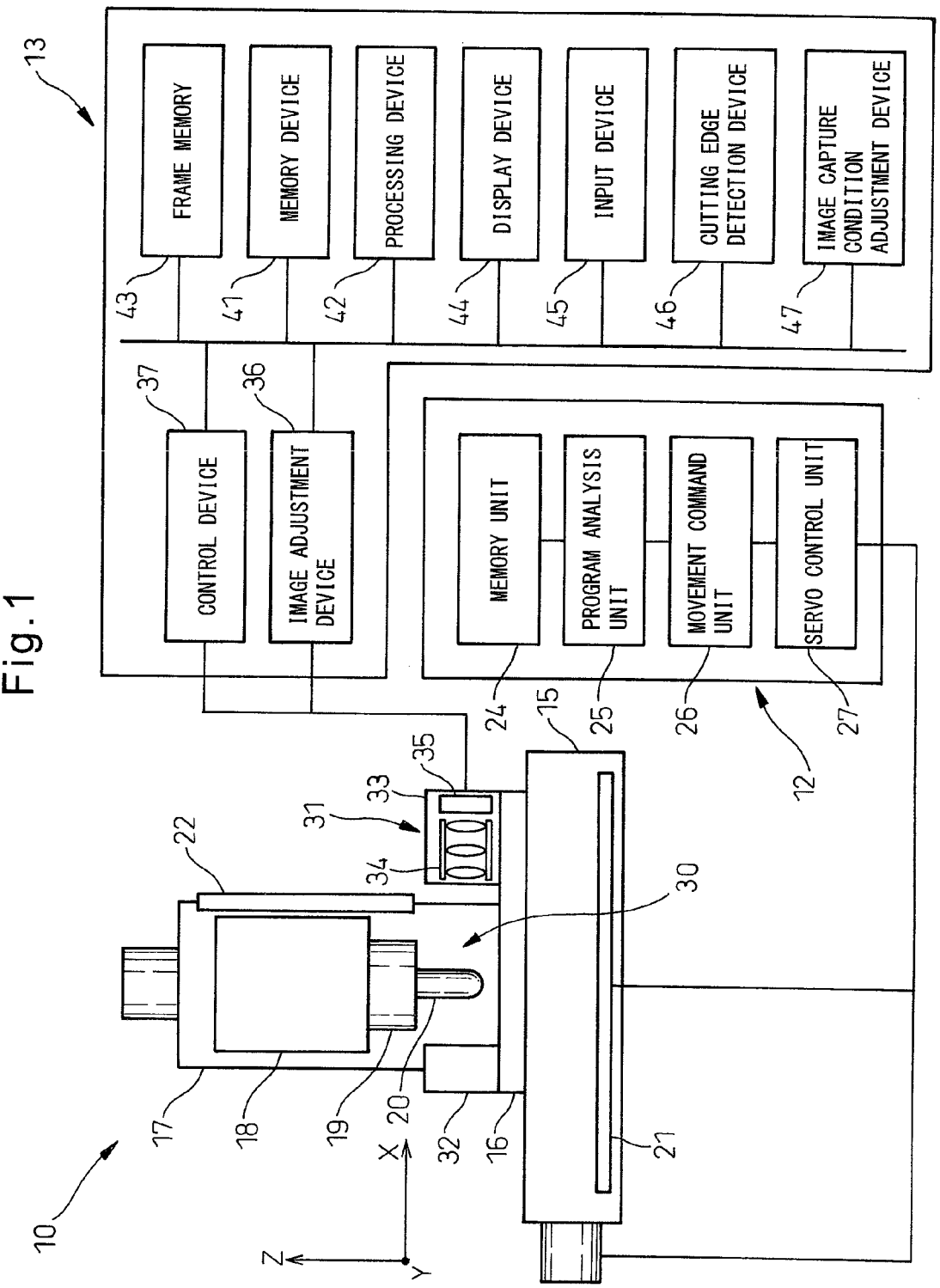
FIG. 1 is a view which schematically shows the configuration of a machine tool which is provided with an apparatus for measurement of tool dimensions according to one embodiment of the present invention.

FIG. 1 is a view which schematically shows the configuration of a machine tool 100 which is provided with the apparatus for measurement of tool dimensions according to one embodiment of the present invention. This machine tool 10 is provided with, not only mechanical parts which perform work on a workpiece (not shown), but also an NC device 12 which controls operation of the machine tool 10 and a dimension measurement apparatus 13 which is connected to the machine tool 10 and the NC device 12 and which measures the dimensions of a tool of a machine tool 10. For the machine tool 10, for example, a five-axis vertical machining center is used. In the present embodiment, the dimension measurement apparatus 13 is shown separate from the NC device 12, but the dimension measurement apparatus 13 may also for example be assembled inside of the NC device 12.

First, the mechanical configuration of the machine tool 10 will be explained. The machine tool 10 is set with an XYZ perpendicular three-axis reference coordinate system. The machine tool 10 is provided with a bed 15 which extends along a horizontal surface, that is, an XY plane, a table base 16 which is arranged on the bed 15, and a column 17 which rises from the bed 15 at the rear of the table base 16 in the vertical direction parallel to the Z-axis. A workpiece (not shown) is fastened on the table base 16. A spindle head 18 is supported on the column 17. At the bottom end of the spindle head 18, a tool 20 is attached facing downward via the spindle 19 in a detachable manner. The tool 20 is driven to rotate by a spindle motor (not shown) which is assembled inside the spindle 19. Here, for the tool 20, for example, a ball end mill is used.

The table base 16 is supported on the bed 15 to be able to move in the horizontal direction (X-axial direction) through a linear feed mechanism. On the other hand, the spindle head 18 is supported at the column 17 to be able to move in the vertical direction (Z-axial direction) and horizontal direction (Y-axial direction) through linear feed mechanisms. The linear feed mechanisms are, for example, provided with ball screws and servo motors which drive rotation of the ball screws. These linear feed mechanisms are used to realize relative movement between the table base 16 and the spindle head 18, that is, the tool 20. The relative movement is realized based on later explained drive signals which are supplied from the NC device 12. The tool 20 which rotates during relative movement contacts the workpiece at a predetermined working point. In this way, the workpiece is worked to a desired shape.

The bed 15 has built into it an X-axial position detector 21 which reads the relative position between the bed 15 and the table base 16 along the X-axis. The column 17 has built into it a Y-axial position detector (not shown) and a Z-axial position detector 22 which read the relative positions between the column 17 and the spindle head 18 along the Y-axis and the Z-axis. For these position detectors, for example, digital scales may be used. The relative positions which are read by these position detectors are specified by the coordinate values of the reference coordinate system. The read coordinate values are output, that is, are fed back, to the NC device 12.

Next, the configuration of the NC device 12 will be explained. The NC device 12 is provided with a memory unit 24 which stores an NC program, a program analysis unit 25 which analyzes the NC program which is stored in the memory unit 24, a movement command unit 26 which generates movement commands in accordance with the NC program which was analyzed by the program analysis unit 25, and a servo control unit 27 which outputs drive signals to the servo motors of the machine tool 10 in accordance with movement commands which are output from the movement command unit 26. The movement commands include, for example, indexing data of the working point of the workpiece and coordinate value data which shows the position of the spindle head 18 corresponding to a working point after indexing.

Next, the configuration of the dimension measurement apparatus 13 will be explained. The dimension measurement apparatus 13 is provided with a dimension measurement unit 31 which is arranged on the table base 16. In the embodiment which is shown in FIG. 1, the dimension measurement unit 31 is provided with a light source 32 and an image capture device 33 which faces the light source 32. For the light source 32, for example, a high luminance LED which outputs parallel light toward the image capture device 33 is used. The image capture device 33 can, for example, move relative to the table base 16 in the YZ plane of the reference coordinate system. The image capture device 33 is provided with a lens unit 34 and CCD (charge coupled device) image sensor 35. The CCD image sensor 35 is, for example, a 2D image sensor. The lens unit 34 is, for example, provided with a plurality of lenses and drives the lenses for zoom-in and zoom-out by an optical zoom operation.

The dimension measurement apparatus 13 is provided with an image adjustment device 36 which receives image data of a captured image from the image capture device 33 and a control device 37 which controls the operation of a light source device 32 and image capture device 33. The above-mentioned CCD image sensor 35 outputs an analog image signal corresponding to an image which is formed on the light receiving surface at, for example, a frame rate of 30 to 60 frames per second. The analog image signal is converted to digital image data by an A/D converter which is built into the image capture device 33 and is output to the image adjustment device 36.

The image adjustment device 36 performs shading correction, noise reduction, white balance adjustment, contour correction, contrast adjustment, and other image adjustment processing and binarizes the digital image data. The image adjustment device 36 stores the image data after image adjustment in the later explained frame memory. On the other hand, the control device 37 outputs a drive signal which controls movement or zoom of the image capture device 33 to the image capture device 33. Note that, in the field of view of the image capture device 33, an xy perpendicular 2-axis field-of-view coordinate system is set corresponding to the YZ plane of the above-mentioned reference coordinate system. The coordinate values of this field-of-view coordinate system are linked with the coordinate values of the reference coordinate system in each field of view of the positions after movement of the image capture device 33 in the YZ plane.

The dimension measurement apparatus 13 is provided with a memory device 41 which stores the dimension measurement program and tool data, a processing device 42 which performs various processing based on the dimension measurement program, a frame memory 43 which stores the image data for each frame, a cutting edge detection device 46 which detects a cutting edge of the tool 20, and an image capture condition adjustment device 47 which detects various image capture conditions at the time of a working operation and automatically adjusts the image capture conditions so that the desired image capture conditions are obtained. In the processing, the dimension measurement program may be read out temporarily to a memory (not shown). Details of the dimension measurement program and tool data will be explained later. Note that, the dimension measurement program may, for example, be read from a FD (floppy disk) or CD-ROM or other portable memory medium to the memory device 41 or may be downloaded from a LAN or Internet or other such computer network to the memory device 41.

The dimension measurement apparatus 13 is, for example, provided with a display device 44 which has a display screen which shows information of two brightness values for each pixel forming the image data which shows the image of a tool 20 (silhouette) or coordinate values of the pixels and an input device 45 which, for example, inputs an instruction to the processing device 42 by designation of a predetermined position on the display screen. The display device 44 may, for example, be a LCD (liquid crystal display) panel or other flat display panel, while the input device 45 may, for example, be a touch panel or a keyboard, mouse, etc. A user, for example, can use a touch panel or a mouse to designate the direction of a contour line of the tool 20 on the image which is displayed on the display screen of the display device 44 or designate a measurement position on a contour line of the tool 20.

Next, the method of measurement of the dimensions of the tool 20 by the machine tool 10 according to the present invention will be explained. In performing the processing, the processing device 42 of the dimension measurement apparatus 13 reads out the dimension measurement program from the memory device 41 to, for example, the memory. In this way, the processing device 42 performs various processing based on the dimension measurement program. First, the processing device 42 outputs a start signal to the NC device 12. In response to receipt of the start signal, the NC device 12 outputs a drive command toward the machine tool 10. As a result, in the machine tool 10, the spindle 19 is positioned on the XY plane at a predetermined reference position between the light source 32 and the image capture device 33 so that the cutting edge of the tool 20 enters it. The tool 20 is driven to rotate about its center of rotation. The spindle head 18, that is, the tool 20, in made to descend in parallel to the Z-axis. Here, the reference position is a position become the reference for instructing stopping of the approach operation of a tool 20 set in advance in the field of view.

At the same time, the processing device 42 makes the light source device 32 and image capture device 33 start operating. The control device 37 outputs a drive signal for driving the image capture device 33. In this way, the image capture device 33 starts capturing an image. The image capture device 33 generates an analog image signal for each frame captured. The image data which is generated from this image signal is stored through the image adjustment device 36 in the frame memory 43 for each frame. If, based on the descent of the spindle head 18, part of the contour of the tool 20 enters into the field of view of the image of the image capture device 33, the descent of the spindle head 18 along the Z-axis is stopped. In this way, part of the contour of the tool 20 is specified inside the field of view of the image of the image capture device 33 of the reference position.

Figure 2:
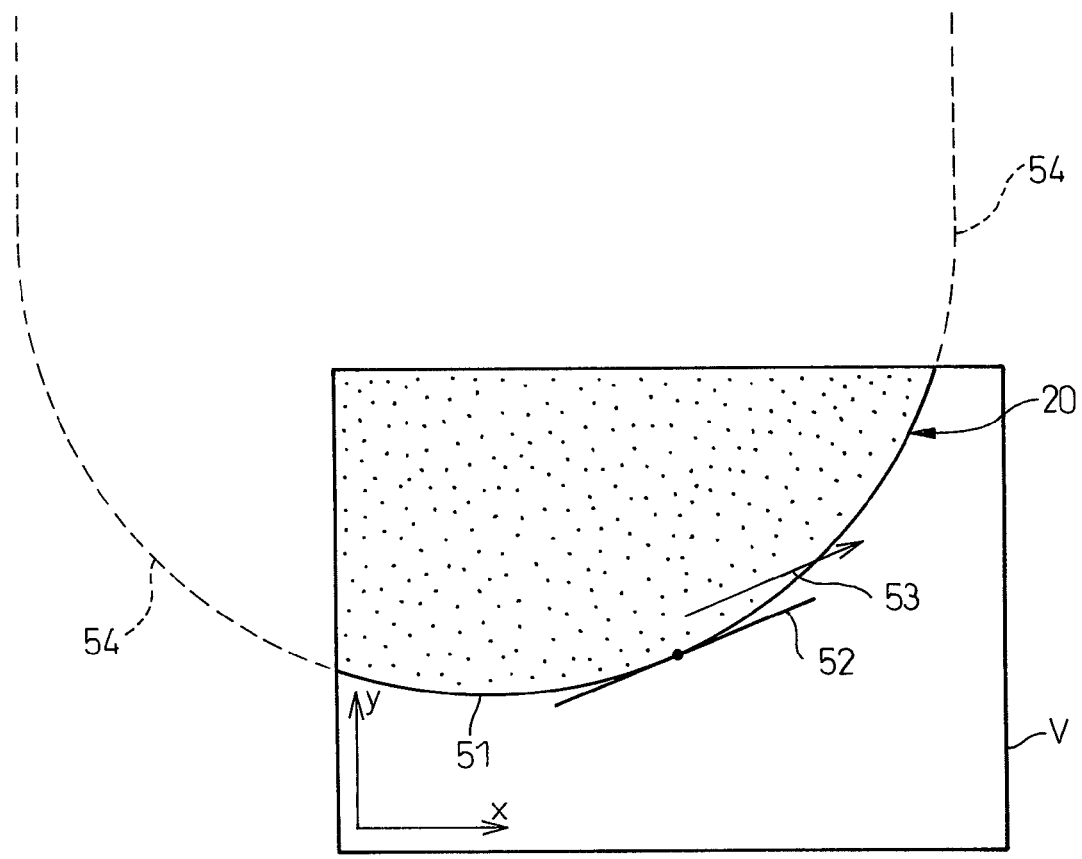
FIG. 2 is a view which shows image data according to a specific example.

At the light receiving surface of the CCD image sensor 35, an image of a projection of a shadow (silhouette) of the tool 20 is formed by parallel light which is emitted from the light source 32. The image data is comprised of a large number of pixels which specify an image inside of the field of view. As explained above, in the image data, two brightness values are specified for each pixel, so, for example, as shown in FIG. 2, in the field of view V specified by the image data of the reference position, the dark pixels are specified as projected parts of the shadow of the tool 20, while the bright pixels are specified as parts receiving the parallel light. In this way, the contour of part of the tool 20 is specified.

Figure 3:
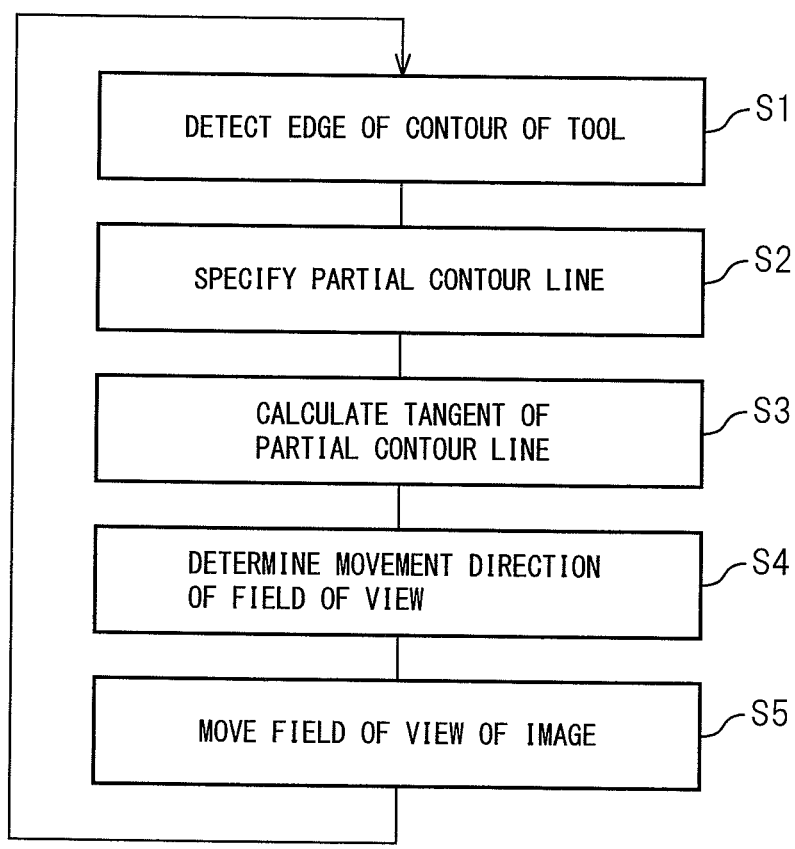
FIG. 3 is a flow chart which shows the flow of processing of a method of measurement of tool dimensions according to a first embodiment of the present invention.

FIG. 3 is a flow chart which shows the flow of processing of the method of measurement of the dimensions of the tool 20 according to a first embodiment of the present invention. For the image data of the reference position which is read out from the frame memory 43, at step S1, the processing device 42 detects the edge of the contour of the tool 20. As explained above, the pixels are shown by two brightness values, so the edge is specified by dark pixels which adjoin bright pixels among the dark pixels which correspond to pixels of the image of the tool 20 in the field of view of the image. In this way, as clear from FIG. 2, at step S2, the processing device 42 specifies a partial contour line 51 based on the extraction of a continuous plurality of dark pixels adjoining bright pixels.

As explained above, inside the field of view of the image capture device 33, an xy perpendicular two-axis field-of-view coordinate system is set, so the coordinate values of the pixels which form the partial contour line 51 are specified. The coordinate values of the field-of-vision coordinate system are linked with the reference coordinate system of the machine tool 10 by, for example, calibration in advance. The coordinate values of the field-of-vision coordinate system are converted to coordinate values of the reference coordinate system. In this way, coordinate values of the partial contour line 51 are specified by the reference coordinate system. Image data of the specified partial contour line 51 is stored in the frame memory 43. The coordinate value data which shows the coordinate values of the partial contour line 51 are stored in the frame memory 43 linked with the image data.

After that, at step S3, the processing device 42 calculates the tangent 52 of the partial contour line 51. The tangent 52 is calculated at an intermediate point which shows coordinate values on the partial contour line 51, that is, coordinate values of an intermediate position of the x-axis direction in the field of view V. In the calculation, for example, the coordinate values of the pixels which form the partial contour line 51 can be used as the basis to derive a numerical formula which specifies the partial contour line 51. The tangent 52 is calculated based on differentiation of this numerical formula. Further, instead of differentiation of the numerical formula, it is also possible to calculate the tangent 52 from the slant which is derived from the pixels of any two points which form the partial contour line 51 (for example, including the above intermediate point).

In this way, based on the calculated tangent 52, at step S4, the processing device 42 determines the movement direction 53 of the field of view of the image capture device 33. Specifically, the two forward and reverse directions which are specified by the tangent 52 are estimated as the direction of the contour line 54 outside the field of view of the field of view V of this image data. Here, the processing device 42 sets one direction among the two forward and reverse directions which are specified by the tangent 52 (for example, top right direction) as the movement direction 53 for making the field of view V of the image capture device 33 move. At step S5, the processing device 42 makes the field of view V move in the direction which is specified by the movement direction 53. The processing device 42 outputs a movement signal which makes the tool 20 and the image capture device 33 move relatively in accordance with the movement direction 53 to the control device 37. Receiving the movement signal, the control device 37 makes the image capture device 33 move for making the tool 20 and image capture device 33 relatively move. Here, the image capture device 33 is made to move in the YZ plane. The field of view V of the image capture device 33 starts to move along the movement direction 53.

Figure 4:
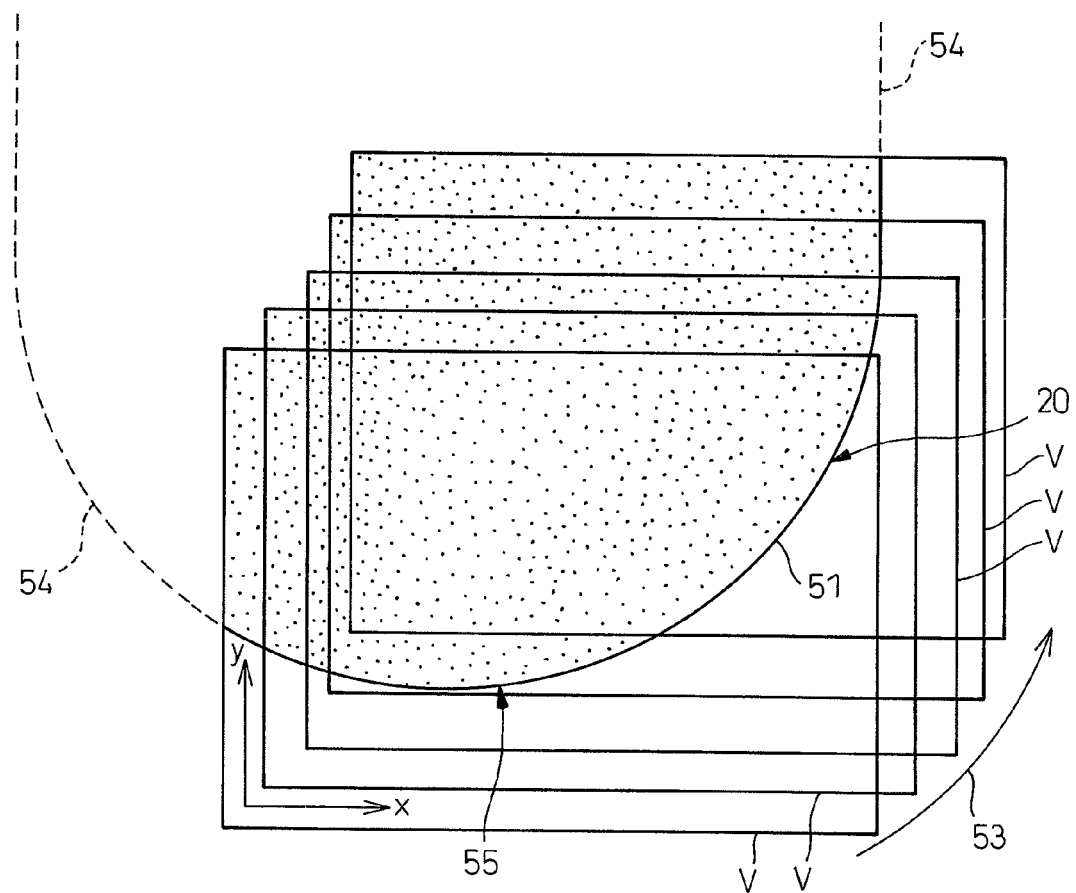
FIG. 4 is a view which shows image data according to another specific example.

After the image capture device 33 and the tool 20 start relative movement, the processing device 42 repeats the processing of step S1 to step S5 based on the image data for each frame. As a result, the movement direction 53 of the field of view V is determined for each frame. In this way, for example, as shown conceptually in FIG. 4, the partial contour line 51 of the tool 20 is specified for each frame. When a plurality of partial contour lines 51 in one direction along the above-mentioned tangent 52 are specified across a desired range, the image capture device 33 is returned to the initial imaging position. The processing device 42 sets the movement direction 53 of the field of view V in the other direction along the tangent 52 (that is, the bottom left direction). The tool 20 and image capture device 33 move relatively in accordance with this movement direction 53. In this way, a plurality of partial contour lines 51 of a desired range of the tool 2 in the other direction are specified. Note that, the partial contour lines 51 do not have to be specified across the entire tool 20. Here, the tool 20 is a ball end mill, so the partial contour lines 51 should be specified until part of the contour line of the shank of the ball end mill, that is, the parallel part, is specified.

The processing device 42 reads out the image data and coordinate value data of all of the partial contour lines 51 which are specified from the frame memory 43 and connects all of the partial contour lines 51 together to form the connected contour line 55. In the connection, for example, the coordinate value data of the individual partial contour lines 51 may be used. As explained above, the coordinate value data is specified by the coordinate values of the reference coordinate system. In this way, as clear from FIG. 5, the connected contour line 55 of the tool 20 is extracted. Using the extracted connected contour line 55 as the basis, the processing device 42, for example, measures the cutting edge position, tool size, etc. of the tool 20. In measurement, the coordinate values of the reference coordinate system are referred to. Note that, the connected contour line 55 and the results of measurement may also, for example, be displayed on the display screen of the display device 44. At this time, the user may use the input device 45 to designate and input a specific position of the tool 20 on the display screen so as to enable the user to designate any measurement position of the tool 20.

In the above way, according to the machine tool 10 according to the first embodiment, if the contour of the tool 20 as a whole does not fit in the field of view V of the image of the image capture device 33 (for example, if capturing the image of a ball end mill of a diameter of 20 mm by a 0.6 mm square field of view), the image capture device 33 and tool 20 are made to relatively move to move the field of view V of the image capture device 33. Further, based on the partial contour line 51 which is specified from the image data, the movement direction 53 for making the field of view V move in the direction of the contour line 54 outside the field of view of one image data is determined, so the image capture device 33 can follow the contour line of the tool 20 by the movement of the field of view V. In this way, even when measuring a tool 20 of dimensions larger than the field of view V of the image capture device 33, for example, a plurality of partial contour lines 51 extending across a desired range are specified. For example, if the specified plurality of partial contour lines 51 are connected, a connected contour line 55 of a desired range of the tool 20 is extracted. As a result, the connected contour line 55 can be used to measure the dimensions of the tool 20.

Figure 5:
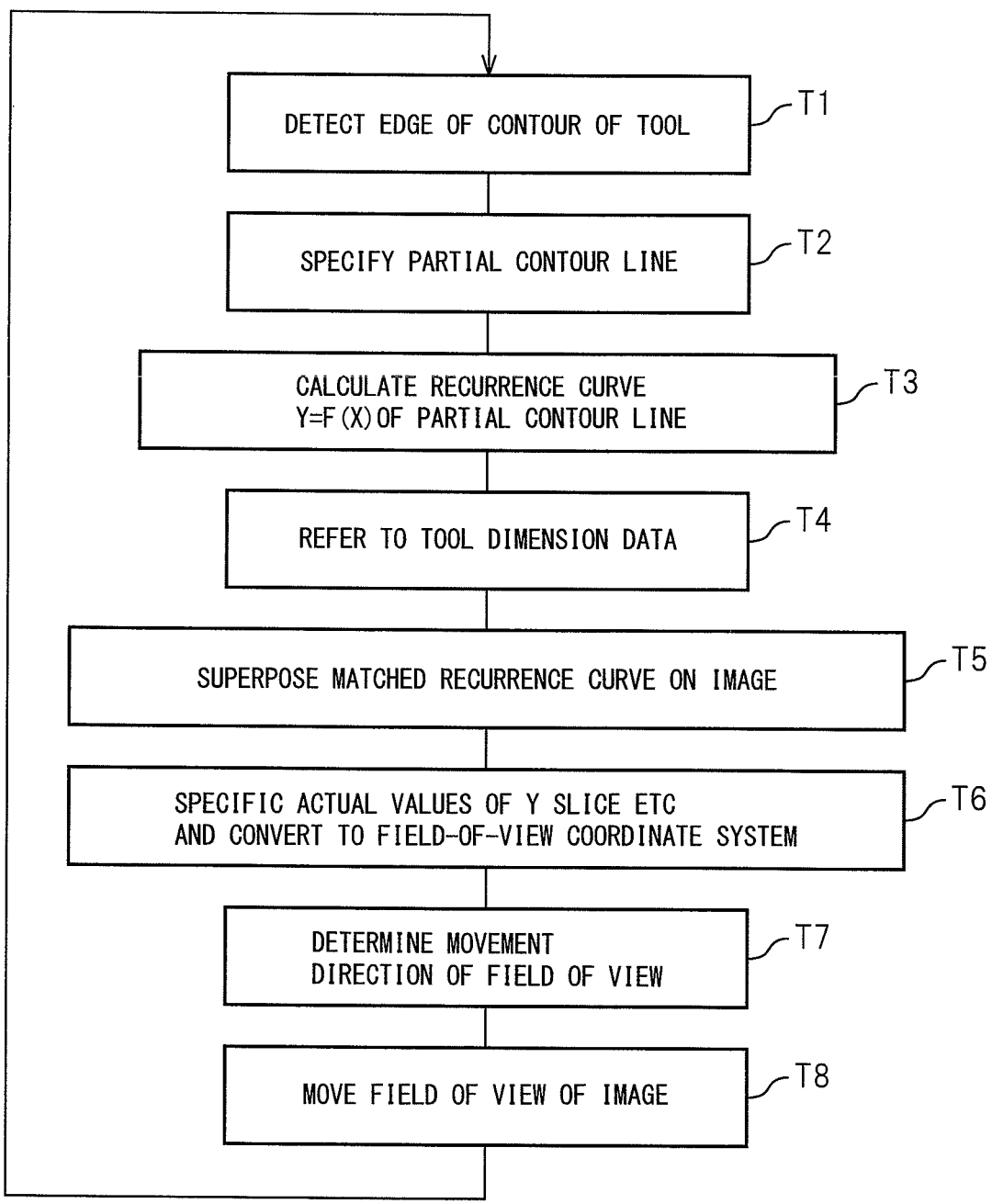
FIG. 5 is a flow chart which shows the flow of processing of a method of measurement of tool dimensions according to a second embodiment of the present invention.

FIG. 5 is a flow chart which shows the flow of processing of the method of measurement of dimensions of the tool 20 according to a second embodiment of the present invention. In this embodiment, in the same way as the above-mentioned steps S1, S2, image data which is stored in the frame memory 43 is read out. At step T1, the edge of the contour of the tool 20 is detected, while, at step T2, a partial contour line 51 is specified from the continuous plurality of dark pixels. Next, at step T3, the processing device 42 calculates a recurrence curve Y=F(X) of the partial contour line 51. In calculation of the recurrence curve, the coordinate values of the pixels in the field-of-vision coordinate system may be referred to. Next, at step T4, the tool dimension data which is stored in the memory device 41, that is, the recurrence curves $Y1=f_1(X)$, $Y2=f_2(X)$ to $Yn-1=f_{n-1}(X)$, $Yn=f_n(X)$, are referred to so as to search for the recurrence curve matching the calculated recurrence curve. Note that, the tool dimension data is the recurrence curve of the contour line of the tool 20 measured in advance for each of various tools 20.

Figure 6:
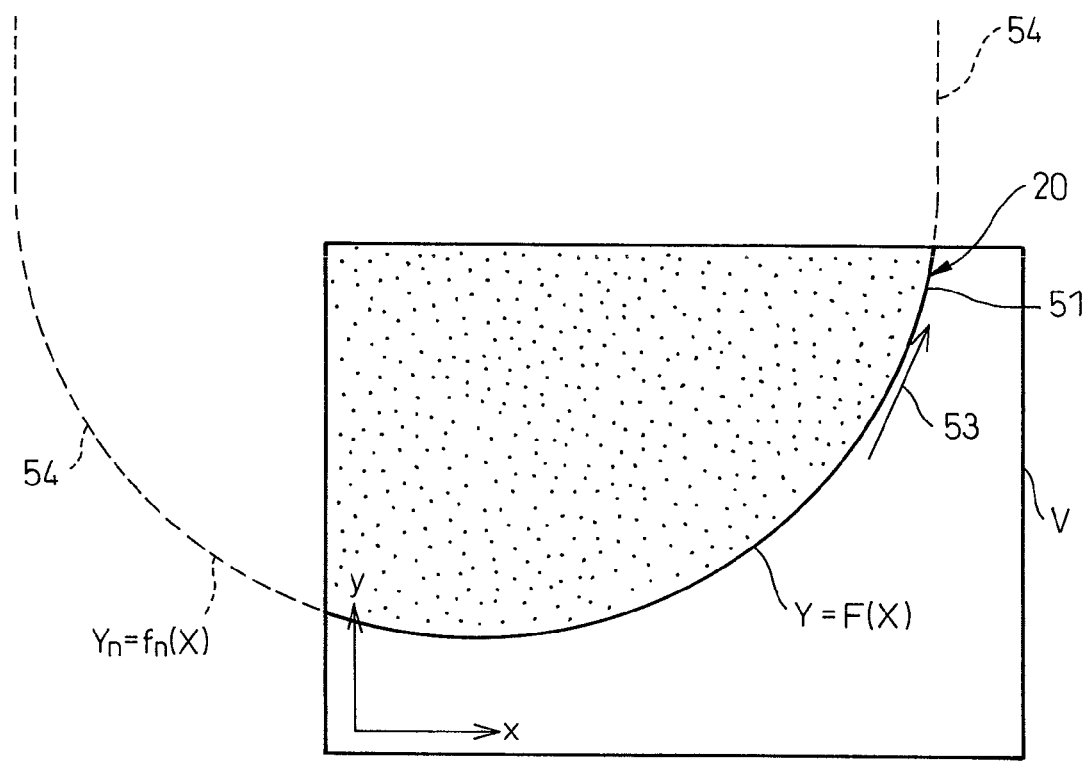
FIG. 6 is a view which shows image data according to still another specific example.

If the recurrence curve $Yn=f_n(X)$ which matches the calculated recurrence curve Y=F(X) is specified, at step T5, the processing device 42, for example, as shown in FIG. 6, superposes the matched recurrence curve $Yn=f_n(X)$ on the recurrence curve Y=F(X) on the image data. Next, at step T6, the processing device 42 specifies the actual values of the Y-slice etc. of the matched recurrence curve $Yn=f_n(X)$ and converts them to coordinate values of the field-of-vision coordinate system. In this way, the direction of the contour line 54 outside the field of view in this image data is specified. At step T7, the processing device 42 uses the specified direction of the contour line 54 as the basis to determine the movement direction 53 of the field of view V of the image capture device 33. In determination, the processing device 42 specifies as the movement direction 53 for example one direction among the two forward and reverse directions along the contour line 54 outside the field of view which is specified by the recurrence curve $Yn=f_n(X)$. At step T8, the processing device 42 makes the field of view V move in the specified movement direction 53. Here, in the field of view V, for example, the top right direction is selected.

In the same way as above, the movement signal which is output from the processing device 42 is used as the basis to move the field of view V of the image capture device 33 in the movement direction 53. The processing device 42 repeats the processing of step T1 to step T8 every frame. In this way, the movement direction 53 of the field of view V of the image capture device 33 is determined for each frame. If partial contour lines 51 in one direction of the above-mentioned contour line 54 are specified over a desired range, the processing device 42 returns the image capture device 33 to the initial imaging position so as to make the field of view move in the other direction of the contour line 54 (for example, left direction of field of view V). The processing device 42 sets the movement direction 53 of the field of view W in the other direction. In accordance with this movement direction 53, the tool 20 and image capture device 33 move relatively. In this way, a plurality of partial contour lines 51 of a desired range of the tool 20 in the other direction are specified. After that, processing similar to the above is performed. Note that, in determining the movement direction 53 of the field of view V, the area occupied by a shadow of a tool 20 in the field of view V of the image capture device 33 may also be used.

Figure 7:
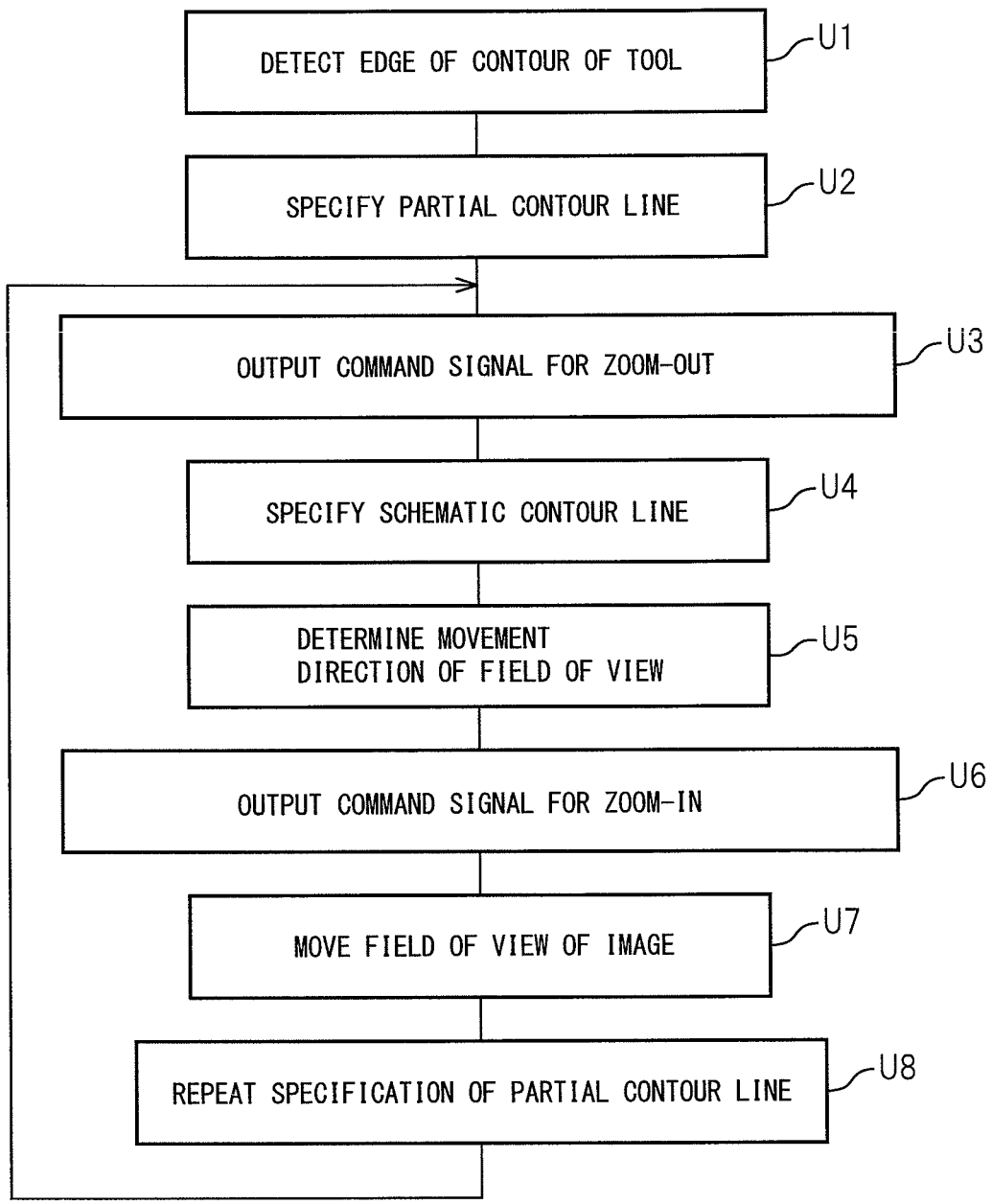
FIG. 7 is a flow chart which shows the flow of processing of a method of measurement of tool dimensions according to a third embodiment of the present invention.
Figure 8:
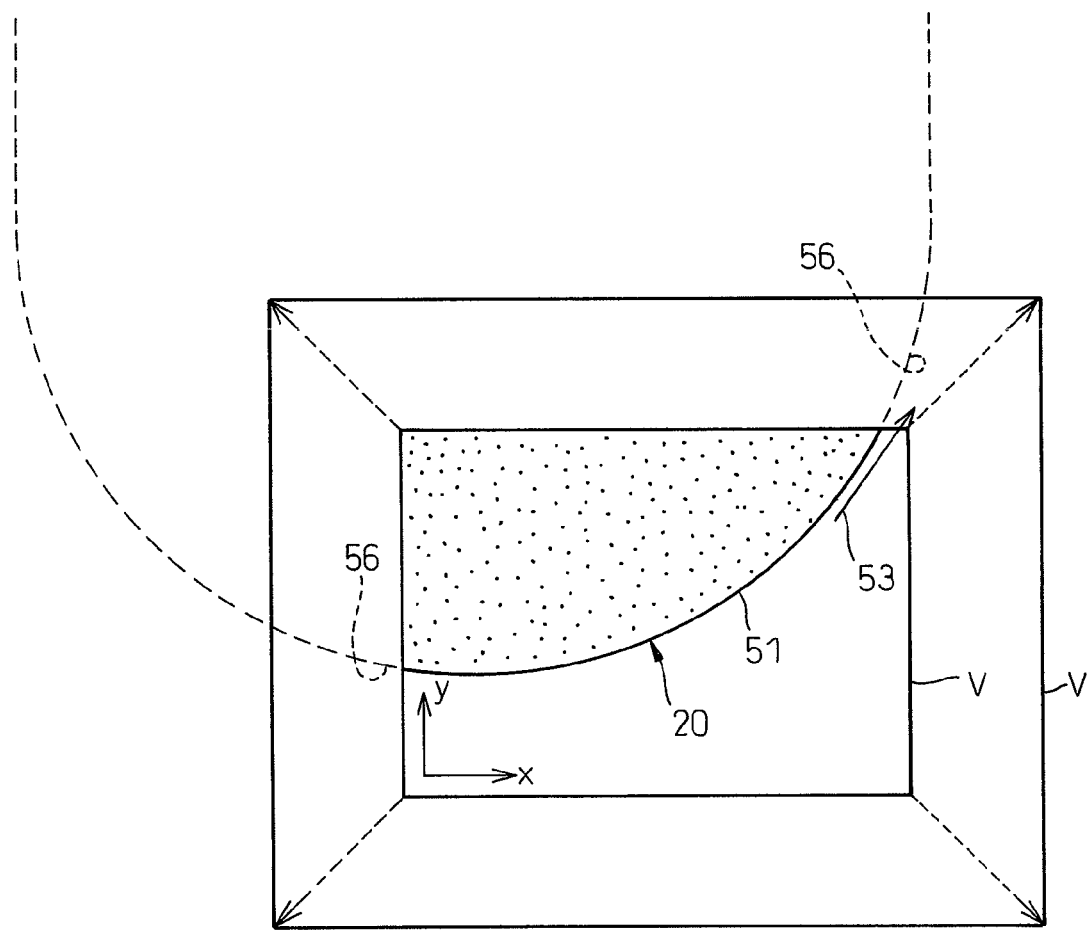
FIG. 8 is a view which shows image data according to still another specific example.

FIG. 7 is a flow chart which shows the flow of processing of the method of measurement of dimensions of a tool 20 according to a third embodiment of the present invention. In this embodiment, in the same way as the above-mentioned steps S1, S2, the image data which was stored in the frame memory 43 is read out. At step U1, the edge of the contour of the tool 20 is detected. At step U2, a partial contour line 51 is specified from the plurality of continuous dark pixels. After that, at step U3, the processing device 42 outputs a command signal which makes the image capture device 33 perform a zoom-out operation to the control device 37. The control device 37 performs a zoom-out operation based on the drive operation of the lens unit 34. As a result, as shown in FIG. 8, the field of view V of the image capture device 33 is enlarged.

At step U4, the processing device 42 uses the image data of the enlarged field of view as the basis to specify the schematic contour line 56 of the tool 20 excluding the partial contour line 51. In specifying this, the above-mentioned technique at the time of specifying the partial contour line 51 is used. At step U5, the processing device 42 uses the specified schematic contour line 56 as the basis to determine the movement direction 53 of the field of view V of the image capture device 33. In the determination, the processing device 42 sets one direction of the two forward and reverse directions which are specified by the schematic contour line 56 as the movement direction 53 for relative movement of the tool 20 and the image capture device 33. Here, for example, the length of the specified schematic contour line 56 may be used as to the basis to specify the distance of the relative movement of the tool 20 and image capture device 33 up to the next zoom-out operation.

At step U6, the processing device 42 uses the output of the command signal as the basis to make the image capture device 33 zoom in to the size of the field of view V first specifying the partial contour line 51. After that, at step U7, the processing device 42 makes the field of view V move in any direction which is specified by the schematic contour line 56. Here, in the field of view V, for example, the movement direction 53 in the top right direction is selected. The processing device 42 outputs a movement signal which makes the tool 20 and the image capture device 33 move relatively to the image capture device 33. In this way, in the same way as explained above, the tool 20 and the image capture device 33 move relatively. During relative movement, the processing device 42 uses the image data which is read out from the frame memory 43 as the basis to specify the partial contour line 51 for each frame.

First, while the tool 20 is moving over a specified distance of relative movement, at step U8, the specification of the partial contour line 51 is repeated. After that, if the tool 20 finishes moving over the distance of relative movement, the processing device 42 repeats the processing of steps U3 to U8. If a plurality of partial contour lines 51 in one direction of the above-mentioned contour line 54 are specified over a desired range, the processing device 42 returns the image capture device 33 to the initial imaging position so as to make the field of view V move in the other direction (that is, the left direction) among the two directions specified by the first specified schematic contour line 56. The processing device 42 sets the movement direction 53 of the field of view W in another direction. The tool 20 and image capture device 33 move relatively in accordance with this movement direction 53. In this way, a plurality of partial contour lines 51 are specified across a desired range of the tool 20. After that, processing similar to the above is performed.

According to the machine tool 10 according to the present embodiment, if the contour of the tool 20 as a whole does not fit in the field of view V of the image capture device 33, the image capture device 33 and tool 20 move relatively to move the field of view V of the image. Before movement, due to zoom-out, the field of view is enlarged compared with the field of view of the initial image, so the direction of the contour line 54 outside the field of view can be reliably confirmed. As a result, the image capture device 33 can follow the contour line 54 by movement of the field of view V. Further, due to zoom-in, the field of view V of the initial image is again realized, so the partial contour line 51 of the tool 20 can be specified with a high precision. If the plurality of partial contour lines 51 specified in this way are connected, a connected contour line 55 of the desired range of the tool 20 is extracted. As a result, the connected contour line 55 can be used to measure the dimensions of the tool 20.

Note that, in the method of measurement of tool dimensions according to the second embodiment, the number of pixels in the image data is constant while the field of view AV is enlarged by a zoom-out operation, so the image capture range specified by the pixels is enlarged. Therefore, the schematic contour line 56 of the tool 20 which is captured at the time of a zoom-out operation only generally specifies the shape of the tool 20. Therefore, in high precision extraction of the contour of the tool 20, it is believed unwise to use the schematic contour line 56.

In addition, the image at the time of zoom-out may, for example, be displayed on the display screen of the display device 44. The user, for example, may use the input device 45 to input instructions for specifically specifying the movement direction 53 of the field of view V on the display screen. At this time, the processing device 42 may specify the movement direction 53 of the field of view V in accordance with an instruction which is input by the input device 45. In addition, in the above embodiment, the lens unit 34 is driven to realize zoom-in and zoom-out of the image capture device 33 by an optical zoom function, but for example, a digital zoom function may also be used to realize zoom-in and zoom-out.

In the above embodiments, the method of measurement and apparatus for measurement of tool dimensions of the present invention were explained using a vertical machining center as an example of the machine tool 10, but the method of measurement and apparatus for measurement of tool dimensions of the present invention may also be realized by, for example, a horizontal machining center or other machine tool. Further, the method of measurement and apparatus for measurement of tool dimensions of the present invention were explained using a ball end mill as an example of the tool 20, but the method of measurement and apparatus for measurement of tool dimensions of the present invention may also be realized by, for example, a flat end mill or drill bit or other tool. Further, in the machine tool 10, instead of movement of the spindle head 18 in the Y-axial direction, the table base 16 may also move in the Y-axial direction. In addition, in realization of relative movement of the image capture device 33 and the tool 20, the tool 20 may move with respect to the image capture device 33.

Figure 9:
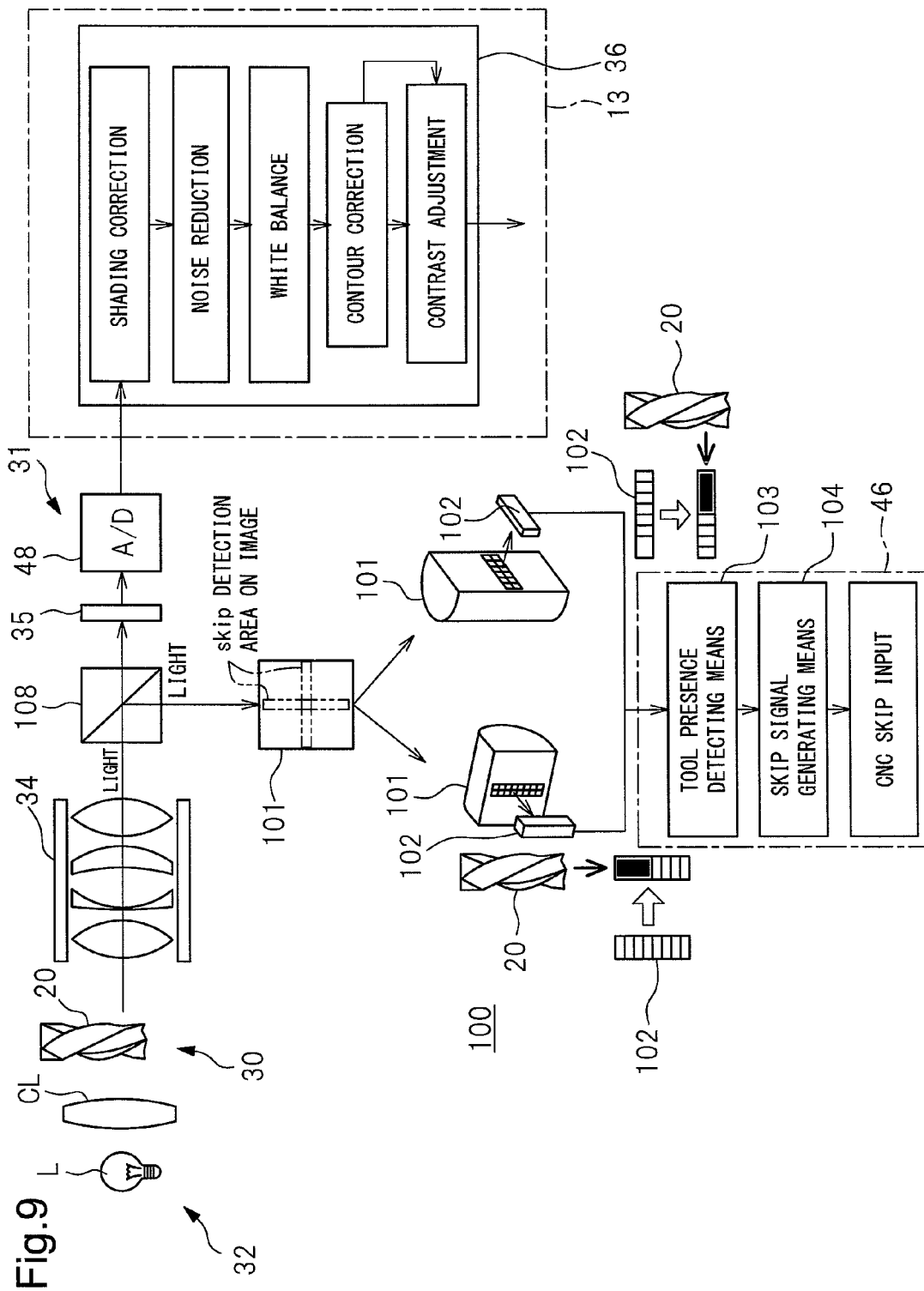
FIG. 9 is a schematic block diagram which shows a specific first type of a cutting edge approach detection unit in an image capture type tool measurement apparatus which is shown in FIG. 1.

Referring to FIG. 9, one embodiment of the cutting edge detection device 46 will be explained. The cutting edge detection device 46 is provided with a half mirror 108 which separates the image of the tool 20 which is captured from the optical path before being formed on the image sensor 35, a cylinder lens 101 which linearly converts the image to a line form, and a line sensor 102 which converts the image signal which was converted to a line form from the cylinder lens 101 to a line form electrical signal.

The cylinder lens 101 can convert rectangular image light to, for example, a linear image signal in the axial direction of the tool 20 or a direction perpendicular to the axis of the tool 20.

The line sensor 102 is a one-dimensional CCD image sensor and comprises a plurality of CCD elements arranged in vertical and horizontal lines.

By the tool 20 entering the image acquisition range, a line sensor 102 which is arranged in the axial direction of the tool 20 can capture it as an image signal of shading in the axial direction, while a line sensor 102 which is arranged in a direction perpendicular to the axis of the tool 20 can capture it as an image signal of shading perpendicular to the axial direction.

Based on the image signal from such a line sensor 102, the tool presence detecting means 103 can, for example, detect the presence of the approach of the tool 20 into the field of view of the image capture unit 30 by the voltage value. If the presence detecting means 103 of the tool 20 detects the approach of the tool 20, the skip signal generating means 104 generates a skip signal which it outputs to a CNC machine tool operation control unit so as to make the tool approach operation of the machine tool stop.

According to the above such cutting edge detection device 46, it is possible to detect approach of the cutting edge of the tool 20 to the inside of the field of view of the image capture unit 30 separate from the image sensor 35 without image processing, so quick detection becomes possible, the skip signal can be reliably generated, high precision and high reliability measurement suitable for automation can be contributed to.

Figure 10:
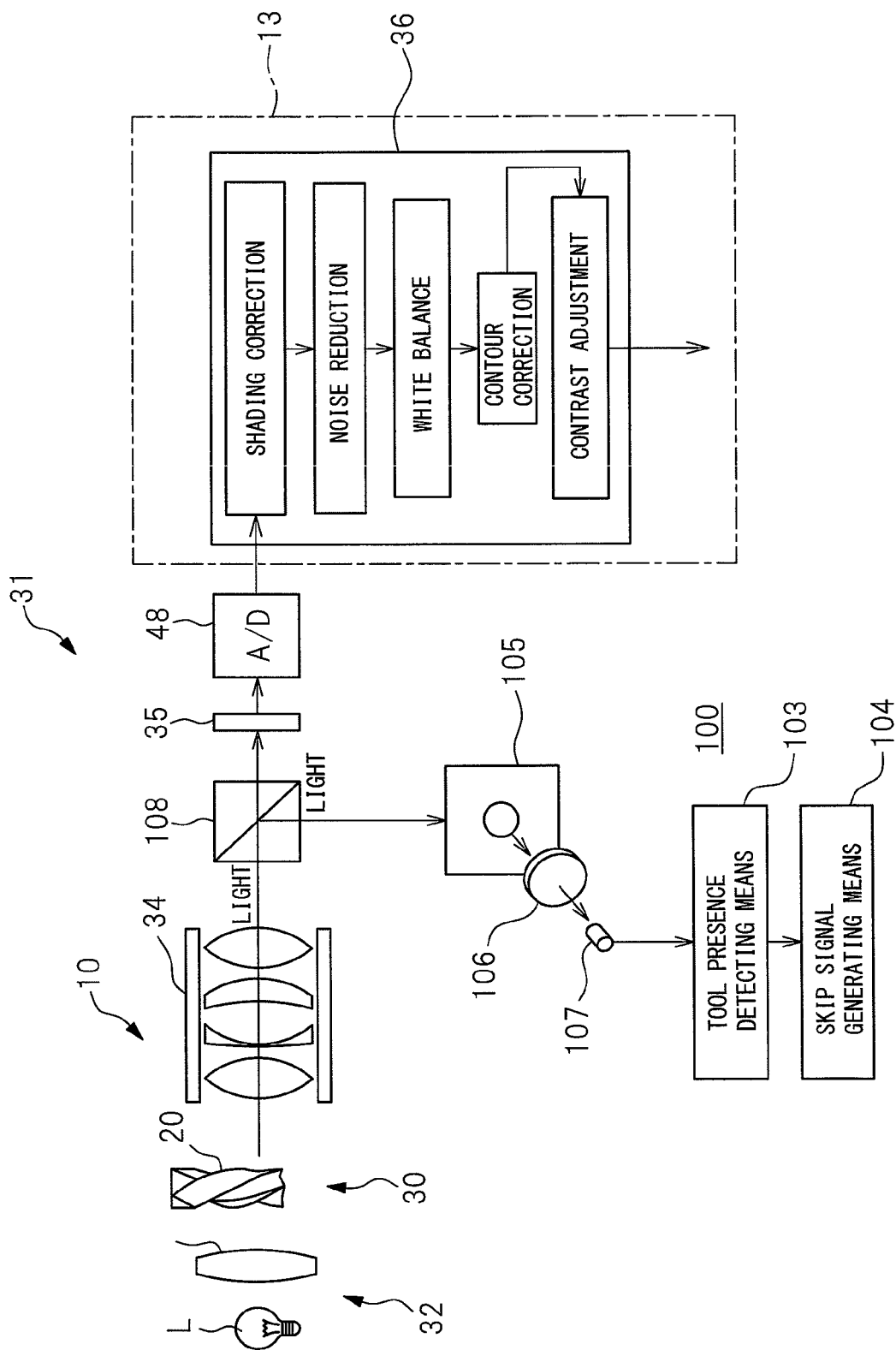
FIG. 10 is a schematic block diagram which shows a specific second type of a cutting edge approach detection unit in an image capture type tool measurement apparatus which is shown in FIG. 1.
Figure 11:
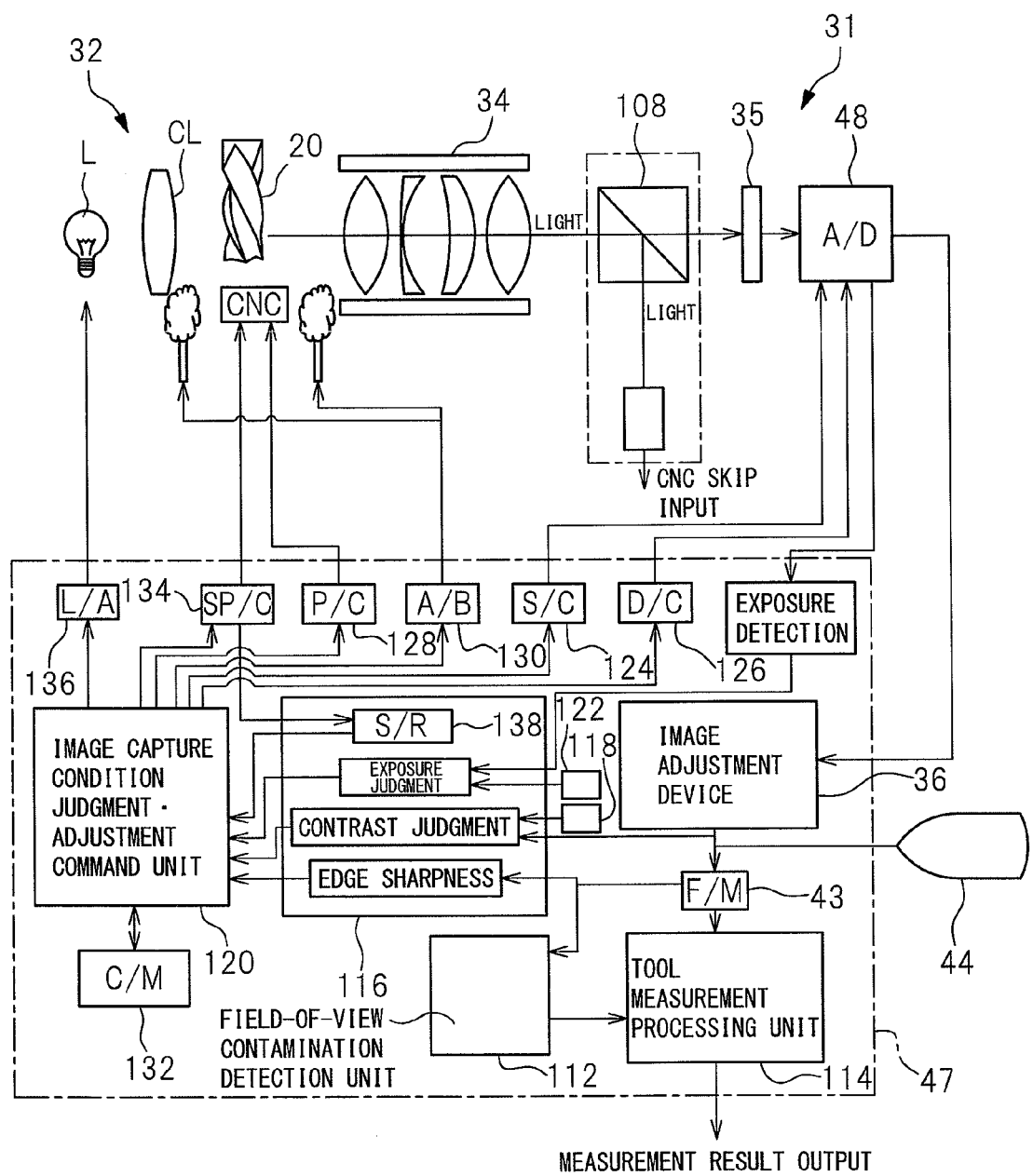
FIG. 11 is a block diagram which shows an example of the system configuration of an image capture type tool measurement apparatus which is shown in FIG. 1.
Figure 12B:
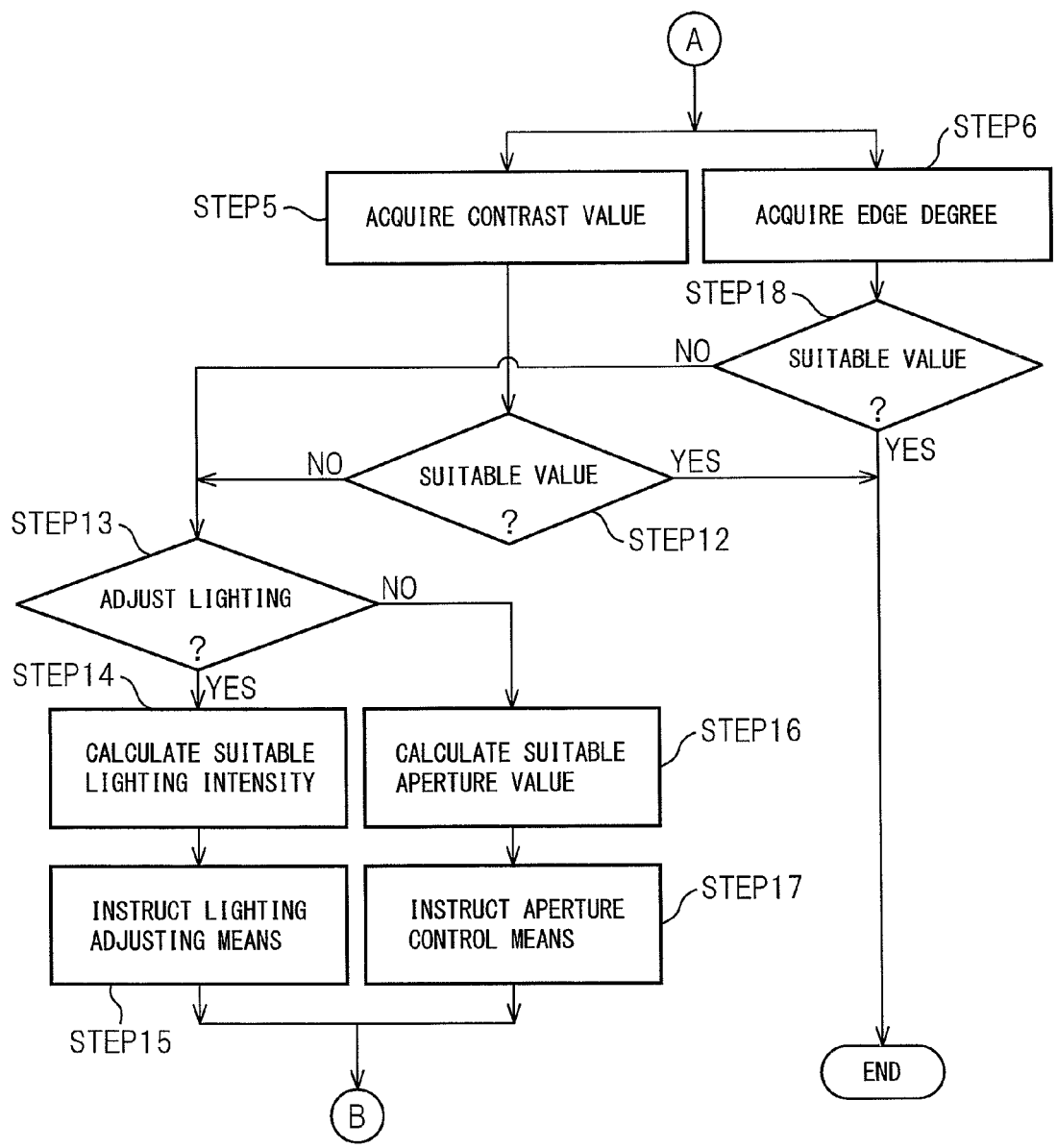
FIG. 12B is a flow chart for explaining one example of a routine in an image capture type tool measurement apparatus according to the present invention for obtaining a grasp of the image capture environment/conditions, judging the image capture conditions, and deriving adjustment commands to adjust the image capture conditions of the image capture element of the image capture unit.

FIG. 10 shows another embodiment of the cutting edge detection device 46. In the present embodiment, the image which is separated by the half mirror 108 from the optical path before formation of the captured image passes through the aperture member 105 and is limited to a spot, is condensed to a spot shape by a condenser lens 106, and is made to strike a phototransistor 107.

The phototransistor 107 turns on/off by sensing if a spot of incident light has become a certain intensity of light or more and sends out an on/off signal to the tool presence detecting means 103. The tool presence detecting means 103 uses the on/off signal as the basis to detect approach of the tool 20. If detecting approach of the tool 20, the skip signal generating means 104 outputs a skip signal to the CNC machine tool operation control unit whereby the tool approach operation of the machine tool is stopped.

In the above cutting edge detection device 46, the half mirror which is interposed in the optical path from the lens unit 34 to the image sensor 35 is used to deflect one-half of the focused light beams to a direction perpendicular to the optical path to detect the approach of the cutting edge, but of course the cutting edge approach detecting means can detect the approach of the tool without the use of a half mirror 108 by providing a contact-less detecting means such as laser detecting means or proximity sensor in the field of view of the worked part.

If using such a contact-less detecting means, it is possible to more directly and speedily detect approach of the cutting edge of a tool, generate a skip signal by a skip signal generating means 104, output a skip signal to an operation control unit of the CNC machine tool, and stop the operation of approach of the tool of the machine tool.

In this way, due to the cutting edge approach detecting means, it is possible to detect the approach of the cutting edge of the tool to the inside of the field of view of the image capture unit separate from the signal processing/control unit which processes the imaging signal from the image capture unit without image processing, so quick detection is possible, the skip signal is reliably generated and feed operation of the tool during an advancing operation can be stopped, and there is no danger of the tool and tool measurement apparatus colliding etc. Therefore, it is possible to contribute to high precision and high reliability measurement suitable for automation.

In the image capture condition adjustment device 47, the data which is written in the frame memory 43 is successively sent to the field-of-view contamination detector 112 and tool measurement/processing unit 114 so as to detect contamination in the field of view due to various factors or measure the high speed rotating tool 20 and output the measurement results. The image adjustment device 36 can sequentially outputs the digital image data processed for image adjustment processing to the display device 44 and display a binarized image of the tool 20 in real time.

The atmosphere around the workpiece which is worked by rotation of the spindle and movement in the differential axial directions is filled with a mist of cutting oil and cutting scraps splattered along with the work. This sticks to the peripheral walls and sticks to the surfaces of the optical system and results in contamination which obstructs high precision, high reliability measurement, so the field-of-view contamination detector 112 obtains a grasp of the degree of contamination and derives a correction value which it sends to the tool measurement/processing unit 114. That is, the field-of-view contamination detector 112 is provided with a field-of-view image fetching means for fetching a field-of-view image from data from the frame memory 43, a field-of-view image memory means for storing the acquired image, a field-of-view contamination image extracting means for extracting a field-of-view contamination image from the field-of-view image memory means, and a field-of-view contamination image memory means for storing a field of view contamination image. Note that, the field-of-view image fetching means and the field-of-view contamination image extracting means perform the fetching operation and the image extraction operation by control commands of the field-of-view contamination detection control means.

The tool measurement/processing unit 114 is provided with a field-of-view contamination image removing means for reading out the data from the frame memory 43 and the data of the field-of-view contamination image memory means of the field-of-view contamination detector 112 to remove the field-of-view contamination image. It successively performs a step of extracting a contour of the tool 20 from the data which is obtained through the field-of-view contamination image removing means and a step of recognizing the shape so as to calculate the cutting edge position, calculate the tool size, and calculate shaking by which it derives shaking of the high speed rotating tool and outputs the results as measurement results.

Further, the image capture condition adjustment device 47 is provided with an image capture environment/condition detection unit 116. The image capture environment/condition detection unit 116 uses the digital image data from the A/D converter 48 or the digital image data which was processed for image adjustment at the image adjustment device 36 as the basis to detect the image capture environment/conditions. Details are explained later, but the image capture environment/condition detection unit 116 detects at least one of the contrast of the image, the sharpness of the edge, the exposure degree, and the rotational speed of the spindle.

The image capture environment/condition detection unit 116 is designed to judge the contrast (shading degree) by comparison of the voltage value of the digital image data after contrast adjustment at the image adjustment device 36 and suitable contrast value memory means 118 (reference voltage value). While details will be explained later, it sends this as the detection signal of the image capture environment/conditions to the image capture condition judgment/adjustment command unit 120.

The image capture environment/condition detection unit 116 detects the rotational speed of the spindle 19 to which the tool 20 is attached as the detected object. The rotational speed of the spindle 19 is one of the elements which determine the image capture environment of the image capture unit 30. That is, this is because the image signal of the tool 20 which is captured fluctuates due to the rotational speed of the tool 20 and, along with this, the degree of the lighting luminance of the image capture environment is affected.

The spindle 19 is controlled in rotation by the spindle control means 134. The image capture environment/condition detection unit 116 is designed to detect the rotational speed of the spindle from this spindle control means 134 by the spindle rotational speed detecting means 138 and send this as the detection signal of the image capture environment/conditions to the image capture condition judgment/adjustment command unit 120.

Further, the image capture environment/condition detection unit 116 is one of the elements which determines the image capture environment of the image capture unit 30 and detects the sharpness of the edge. The image capture environment/condition detection unit 116 is designed to judge the data from the frame memory 43, that is, the sharpness of the edge from the image signal of the tool 20 (for example, the gradation of the image data of the contour of the tool 20) and send this as the detection signal of the image capture environment/conditions to the image capture condition judgment/adjustment command unit 120.

Furthermore, the image capture environment/condition detection unit 116 is one of the elements which determines the image capture environment of the image capture unit 30 and detects the degree of exposure. The image capture environment/condition detection unit 116 is designed to detect exposure from the digital data which is obtained by converting the electrical signal which is acquired by the image sensor 35 by the A/D converter 48, to judge exposure based on the suitable exposure value memory means 122, and to send the image capture condition judgment/adjustment command unit 120 as the signal of the image capture environment/conditions.

Further, the image capture condition judgment/adjustment command unit 120 uses the above such signal relating to the image capture environment/conditions as the basis to suitably judge if the image capture unit 30 is in a desired image capture environment in which high precision image data of a tool 20 can be obtained and, if not in that image capture environment, corrects it to the desired image capture environment by issuing an adjustment command to elements which determine the image capture environment of the image capture unit 30 and making them operate to adjust the image capture conditions.

For example, for the light source L used as the element which determines the image capture environment of the image capture unit 30, the image capture condition judgment/adjustment command unit 120 controls a predetermined lighting adjusting means 136 (light adjusting circuit) to adjust the luminance.

Further, for the spindle 19 with the tool 20 attached, the image capture condition judgment/adjustment command unit 120 gives an adjustment command signal for changing the rotational speed to the spindle control means 134 so as to adjust the rotational speed of the spindle 19.

Further, for the A/D converter 48 which converts the electrical signal which is acquired by the image sensor 35 to digital data, the image capture condition judgment/adjustment command unit 120 sends an adjustment command to the shutter control means 124 so as to adjust the suitable value of the sampling time and change the frame rate.

Furthermore, the image capture condition judgment/adjustment command unit 120 gives an adjustment command signal to the aperture control means 126 to change the range of conversion of the digital data.

In addition, when the position of the tool 20 being measured on the table is offset from the imaging range, the image capture condition judgment/adjustment command unit 120 sends an adjustment command signal to the position changing means 128 of the measured object so as to adjust movement of the table base 16 which carries the measurement apparatus 10 in the XY direction.

Further, when cutting scraps, cutting oil, etc. stick to the table base 16 which fastens the workpiece, the workpiece, etc. and a mist of the cutting oil etc. floats in the ambient atmosphere of the working operation, the image capture condition judgment/adjustment command unit 120 sends a control command signal to the air blow control means 130 so as to eject high pressure air around the workpiece.

Further, the image capture condition judgment/adjustment command unit 120 is designed to judge the image capture conditions of the lighting luminance, shutter speed, suitable value of sampling time, and spindle rotational speed from condition data of information of the image capture environment/condition detection unit 116 and contrast of the image at the time of a past image capture operation, sharpness of the edge, exposure value, and rotational speed of the spindle (image capture environment memory means 132).

That is, before the start of the measurement operation, the image capture condition judgment/adjustment command unit 120 stores image capture conditions of the lighting luminance, shutter speed, suitable value of the sampling time, and rotational speed of the spindle at the time of a clean image capture environment, which were detected in advance in the image capture environment/condition detection unit 116, in the image capture environment memory means 132 as the image capture environment/conditions at the time of a clean image capture environment and detects the image capture environment/conditions at a suitable time at the time of measurement after that at the image capture environment/condition detection unit 116 to judge a change in the image capture environment and adjust the image capture conditions by a comparison by the image capture condition judgment/adjustment command unit 120 with the image capture environment/conditions at the time of a clean image capture environment.

Furthermore, the image capture environment memory means 132 stores in advance the captured image of only the image capture field of view at the time of a clean image capture environment in the state with no tool 20 or other imaging object. Through use by measurement after that, the image capture environment/condition detection unit 116 detects the captured image in the state with no imaging object. The image capture condition judgment/adjustment command unit 120 judges the differential image between the captured image of only the image capture field of view at the time of a clean image capture environment and the captured image of only the image capture field of view after measurement as the contamination at the lens unit 34 and the light source L and erases the differential image from the field-of-view image at the time of image capture after that.

The measurement apparatus 10 performs such judgment and adjustment of the image capture environment before starting the measurement operation or at a suitable time at the time of measurement after that and furthermore through use by measurement after that, so the image capture condition adjustment device 47 can contribute to error-free high precision measurement at all times.

Next, the routine in the image capture condition adjustment device 47 for specifically adjusting the image capture environment will be explained based on the example of the flow chart which is shown in FIG. 3.

Due to the measurement operation start command, the machine tool 10 drives the rotation of the tool 20 which is attached to the spindle 19, issues a descent command along the Z-axis direction, and moves the tool to descend toward the workpiece which is fastened to the table base 16. Due to this, it is possible to make the tool 20 which is being measured for state of rotation approach the field of view struck by parallel light through the condenser lens CL from the light source L (step 1).

Light which runs from the light source L through the condenser lens CL and passes through the tool 20 as parallel light passes through the lens unit 34, passes through the half mirror 108, and forms an image on the light receiving surface of the image sensor 35 constituted by the 2D CCD image sensor. This formed image is converted by the image sensor 35 to an electrical signal. This electrical signal is converted by the A/D converter 48 to digital data by a predetermined frame rate and sent to the image adjustment device 36.

The image capture condition adjustment device 47 fetches an exposure value from the A/D converter 48 (step 2), takes out an exposure detection signal, and sends it to the image capture environment/condition detection unit 116, then the image capture environment/condition detection unit 116 judges if the exposure value is a suitable exposure value (step 3). At step 3, the image capture environment/condition detection unit 116 judges the exposure based on the suitable exposure value memory means 122. The image capture condition judgment/adjustment command unit 120 judges that the environment is a preferable image capture environment for exposure if the exposure value is a suitable exposure value and ends the routine for adjusting the exposure value—which is one of the image capture conditions.

On the other hand, when the image capture environment/condition detection unit 116 judges that the exposure value is not a suitable exposure value, the image capture condition judgment/adjustment command unit 120 acquires the spindle rotational speed from the image capture environment/condition detection unit 116 as a signal which shows other image capture environment/conditions (step 4), obtains a contrast value (step 5), and further obtains a sharpness of the contour of the tool 20 which is judged by the image capture environment/condition detection unit 116 as the edge degree (step 6).

At step 4, the image capture condition judgment/adjustment command unit 120 acquires the spindle rotational speed based on the detection signal from the spindle rotational speed detecting means 138 at the image capture environment/condition detection unit 116, then determines the shutter speed for obtaining digital data at the A/D converter 48 from the spindle rotational speed (step 7). Next, the image capture condition judgment/adjustment command unit 120 judges if the rotational speed of the spindle 19 has to be adjusted (step 8). If the rotational speed has to be adjusted, it outputs an adjustment command to the spindle control means 134 (step 9), adjusts the rotational speed of the spindle 19, and returns to step 2. On the other hand, if the rotational speed does not have to be adjusted, the image capture condition judgment/adjustment command unit 120 calculates the suitable shutter speed which meets that rotational speed (step 10), outputs an adjustment command to the shutter control means 124 (step 11), changes the shutter speed for obtaining digital data at the A/D converter 48, and returns to step 2.

When obtaining the contrast value at the above step 5, the image capture environment/condition detection unit 116 compares the processing signals from the suitable contrast value memory means 118 and the image adjustment device 36 to judge the contrast and sends the result as the contrast value as a signal showing the image capture environment/conditions to the image capture condition judgment/adjustment command unit 120, then the image capture condition judgment/adjustment command unit 120 judges if the contrast value is a suitable value (step 12). If the contrast value is a suitable value, it is judged that the environment is a preferable image capture environment and the routine for adjusting the image capture environment is ended. On the other hand, if the contrast value is a suitable value, the image capture condition judgment/adjustment command unit 120 judges that the lighting has to be adjusted (step 13).

If, at step 13, it is judged that adjustment of the lighting is necessary, the image capture condition judgment/adjustment command unit 120 calculates a suitable lighting intensity (step 14), outputs an adjustment command to the lighting adjusting means 136 (step 15) to adjust the light source L, and returns to step 2. On the other hand, if judging that the lighting does not have to be adjusted, the image capture condition judgment/adjustment command unit 120 calculates a suitable aperture value (step 16) and gives the aperture control means 126 an adjustment command signal (step 17) to change the range of conversion of the digital data, then returns to step 2.

Further, when acquiring the edge degree in the above-mentioned step 6, the image capture condition judgment/adjustment command unit 120 fetches a signal relating to the edge degree from the image capture environment/condition detection unit 116 as a signal which shows the image capture environment/conditions and judges if the edge degree is a suitable value for judging if the contour of the image of the tool 20 is sharp (step 18). If the edge degree is a suitable value, it judges that the environment is a preferable image capture environment and the image capture condition judgment/adjustment command unit 120 ends the routine for adjusting the edge degree as an image capture condition. On the other hand, if the edge degree is not a suitable value, the routine returns to step 13 where the image capture condition judgment/adjustment command unit 120 judges if adjustment of the lighting is necessary.

The routine for adjusting the image capture environment explained above is fetched as a signal showing each of the image capture environment/conditions. By repeatedly executing an image capture condition judgment/adjustment command in parallel with a measurement operation, the image capture condition adjustment device 47 can contribute to high precision and high reliability measurement at all times and it is possible to provide a high precision and high reliability image capture type tool measurement apparatus and method suitable for automation.

Note that, the above-mentioned routine for adjustment of the image capture environment is one example. In addition, it is of course also possible to set a routine for suitably adjusting the image capture environment in accordance with the functions and specifications of the machine tool. Further, in the present embodiment, the image separated by the half mirror 108 was used to generate a skip signal, but an image which was acquired by the image sensor 35 may also be used to generate a skip signal without using a half mirror 108.

The invention claimed is:

1. A method of measurement of tool dimensions which uses an image capture device which moves relative to a tool, attached to a spindle of a machine tool, to capture an image of said tool to obtain an image data being used to measure dimensions of said tool, and the tool being adapted to machine a workpiece by contacting the workpiece, the method of measurement of tool dimensions comprising the steps of:

providing the image capture device;

providing a light source adapted to output parallel light toward the image capture device;

placing the tool between the image capture device and the light source;

outputting parallel light from the light source to project a shadow of the tool on the image capture device;

obtaining binary image data of the tool based on the shadow of the tool projected on the image capture deice;

specifying a partial contour of a portion of said tool based on the binary image data;

determining a direction for moving the field of view of said image capture device toward a portion of the contour of said tool outside the field of view by calculating a regression curve or a tangential line of the specified partial contour;

outputting movement commands for making said image capture device and said tool move relative to each other in a plane of a reference coordinate system corresponding to the two orthogonal axes of a field-of-view coordinate system of the image capture device so that the field of view of said image capture device moves in the determined direction of movement of said field of view;

obtaining image data of a plurality of images by repeating sequentially the steps of specifying said partial contour, determining the direction of movement of said field of view, and outputting said movement commands for relative movement of said image capture device and said tool, and extracting a connected contour of said tool by connecting the partial contours based on said obtained image data of said respective images whereby the dimensions of said tool are measured by using said connected contour of said tool.

2. An apparatus for measurement of tool dimensions which captures an image of a tool, attached to a spindle of a machine tool, to obtain an image data, the obtained image data being used to measure dimensions of said tool, the tool being adapted to machine a workpiece by contacting the workpiece, the apparatus for measurement of tool dimensions, comprising:

an image capture device;

a light source facing the image capture device so that the tool is placed between the light source and the image capture device, the light source being adapted to output parallel light toward the image capture device to project a shadow of the tool on the image capture device when the tool is placed between the light source and the image capture device, wherein the image capture device generates binary image data based on the shadow of the tool; and a processing device for specifying a partial contour of a portion of said tool based on the binary image data, determining a direction for moving the field of view of said image capture device toward a portion of the contour of said tool outside the field of view by calculating a regression curve or a tangential line of the specified partial contour, outputting movement commands for making said image capture device and said tool move relative to each other in a plane of a reference coordinate system corresponding to the two orthogonal axes of a field-of-view coordinate system of the image capture device so that the field of view of said image capture device moves in the determined direction of movement of said field of view, and obtaining image data of a plurality of images by repeating sequentially specifying said partial contour, determining the direction of movement of said field of view, and outputting said movement commands for relative movement of said image capture device and said tool, and extracting a connected contour of said tool by connecting the partial contours based on said obtained image data of said respective images whereby the dimensions of said tool are measured by using said connected contour of said tool.

3. The apparatus for measurement of tool dimensions according to claim 2, further provided with a display device which displays a shape of said tool which is specified based on said image data and an input device which inputs a predetermined command regarding the shape of said tool on said display device.

* * * * *